B. F. SPARR.
ROLLER BEARING.
APPLICATION FILED JAN. 10, 1916.
1,190,965.
Patented July 11, 1916.
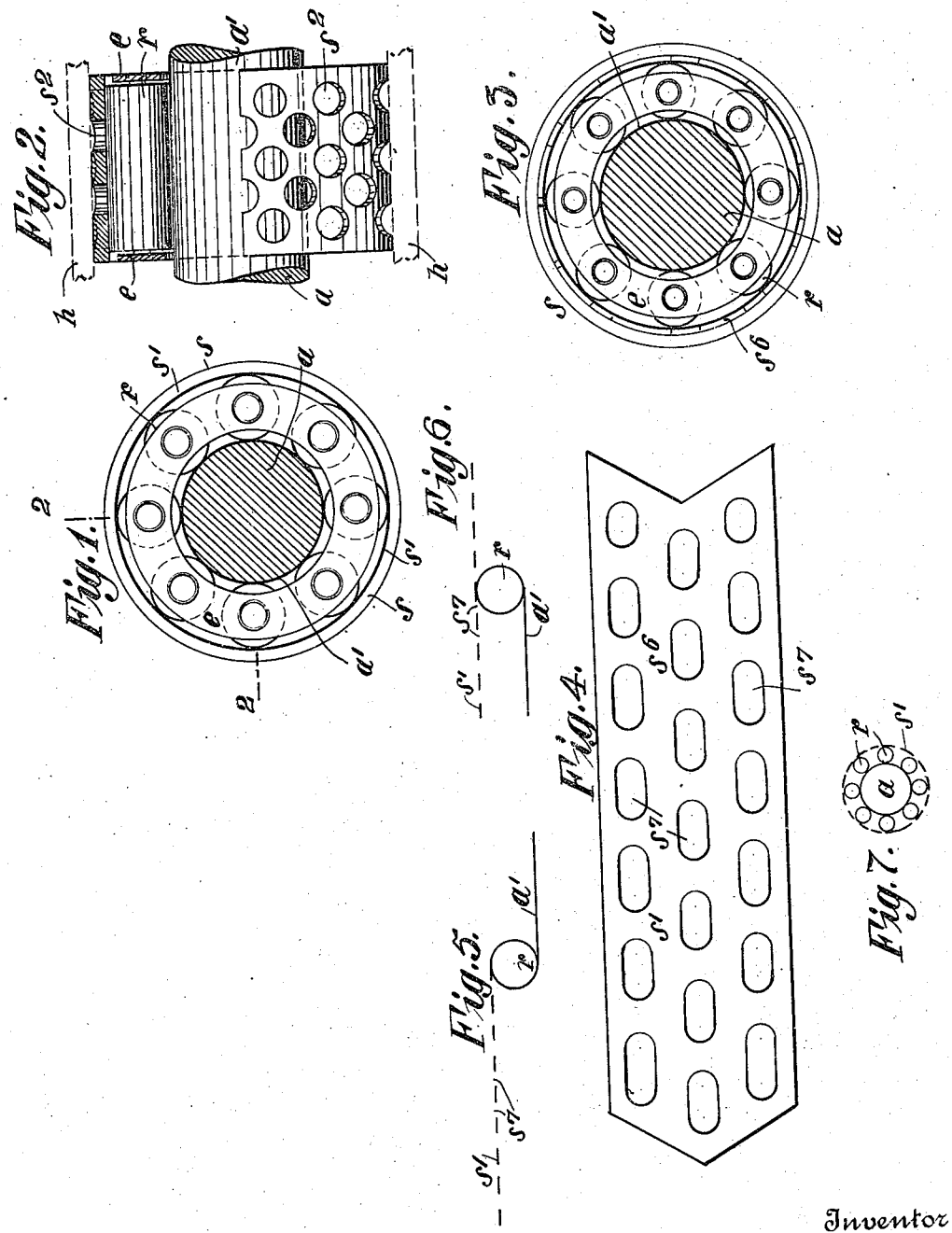
Inventor
Benjamin F. Sparr
By his Attorney
Geo. W. Miatt

UNITED STATES PATENT OFFICE.

BENJAMIN FRANKLYN SPARR, OF NEW YORK, N. Y.

ROLLER-BEARING.

1,190,965.

Specification of Letters Patent. Patented July 11, 1916.

Application filed January 10, 1916. Serial No. 71,145.

*To all whom it may concern:*

Be it known that I, BENJAMIN F. SPARR, a citizen of the United States, and a resident of the borough of Brooklyn, county of Kings, city and State of New York, have invented certain new and useful Improvements in Roller-Bearings, of which the following is a specification.

My improvements relate to roller bearings generally, and are designed to reduce frictional resistance therein and thus obviate excessive heating and deterioration of parts, thereby rendering the bearings more effective and durable, as hereinafter more fully set forth.

My invention consists in the specific construction of parts described and claimed, a distinctive feature being the formation of the concave bearing surface of the shell with a series of holes which not only reduce its area of frictional contact with the rollers but also act as pockets for the reception and equitable distribution of a lubricant.

In the accompanying drawings, Figure 1, represents a transverse section of an axle or shaft, and showing an end view of the bearing; Fig. 2, is a sectional elevation taken upon planes of lines 2—2, Fig. 1; Fig. 3, is a transverse section of a shaft, axle, or journal, and an end view of the bearing, in which the shell is provided with a lining formed in accordance with the distinctive feature of my invention; Fig. 4, is a view of the lining extended flat; Figs. 5, 6, and 7, are diagrams illustrating the nature and object of the invention.

The above drawings illustrate more or less symbolically the essential feature of my invention, which is the formation of the shell or lining surrounding the rollers with a series of holes in such manner as to make a frictional contact therewith equal only, or approximately so, to that of said rollers with the inner contacting surfaces,—*i. e.*, the periphery of the shaft, axle, or journal to which the bearing may be applied,—an incidental and resultant feature in this connection being the formation, in said surrounding shell or lining, of pockets or recesses for the accommodation and retention of the lubricant used in the bearing. For instance the shell *s*, as constructed heretofore has usually had a continuous, uniform internal surface for contacting with the peripheries of the rollers *r*, *r*,—that is to say a continuous contacting surface both lengthwise and laterally considered.

Referring to the diagrams Figs. 5, 6 and 7, it is obvious that as the roller *r*, rolls over the periphery *a'*, of the axle, shaft, or journal *a*, for a given distance it must contact with a much greater length of the inner surface *s'*, of the shell *s*. Thus, suppose the roller in Figs. 5 and 6, (in which for convenience of illustration the contacting surfaces of the shell *s*, and the axle *a*, are shown as extended horizontally) to be of one third of an inch diameter the complete turn of the roller *r*, on its axis will represent a travel of approximately one inch in contact with the peripheral surface *a'*, of the axle or part *a*, and a travel of approximately two inches of the inner surface *s'*, of the surrounding shell *s*, in contact with the periphery of said roller *r*. In other words the roller in making one rotation on its axis has contacted peripherally with substantially twice as much surface of the surrounding shell *s*, as compared with its said contact with the periphery of the axle, shaft, or journal *a*. To obviate this, and render the actual contacting surface *s'*, of the containing shell *s*, approximately equal only to the contacting peripheral surface *a'*, of the part *a*, for each rotation of the roller *r*, I reduce said inner contacting surface *s'*, of the shell *s*, by a series of holes $s^2$, formed in the containing shell *s*, extending therethrough and closed externally by the housing *h*, while in Figs. 3 and 4, a like result attained by the use of a sheet lining $s^6$, is shown, formed with perforations $s^7$, which reduce the contact surface *s'*, while constituting pockets for the reception and distribution of the lubricant.

The preferred form of lining is constructed of a flat blank or a sheet metal strip, as seen in Fig. 6, provided with the perforations $s^7$ and having both ends thereof beveled, one with a V-shaped projecting portion and the other end with a corresponding depression to receive the same when the strip is bent. When the strip is bent into cylindrical form to constitute the lining, the V-shaped ends constitute an overlapping joint, facilitating the transition of the rollers without friction or jar. This interlocking connection serves to prevent lateral displacement and a lining thus constructed has been found to be most practical and economical. In fact the holes however formed in the interior contacting surface s', of the shell s, act as receptacles for the lubricant which will be driven into them, and held therein, by centrifugal force, to be fed to the peripheries of the rollers r, r, as the shell s, turns upon them, thus insuring an equitable and uniform distribution of the lubricant, reducing frictional resistance to the minimum, and by preventing overheating and consequent deterioration adding materially to the life and efficiency of the bearing.

Where the contacting surface s', of the shell is perforated, as shown for instance in Figs. 2, and 4, the holes are preferably staggered or arranged alternately as related to each other transversely of the surface s', so as to render said contacting surface s', considered as a whole, as uniform and continuous as possible consistent with its reduction in area.

By equalizing the contacting surface s', of the shell s, as related to the periphery of the part a, I render the wear uniform so that the life of one contacting surface is equal to that of the other, and crystallization of the metal from overheating is avoided, while a lighter running, minimum resistance bearing is attained.

The rollers may be mounted between the annular end members e, e, of a cage in a manner well known in the art, or be otherwise spaced and supported as may be found most expedient.

It is also to be understood that by the use of the term "rollers" I do not intend to confine myself to the use of cylindrical rollers such as shown in the drawings, as the essential features of the invention are obviously applicable to conical and other forms of elongated rollers.

It will thus be seen that the essential feature of my invention is the formation of the concave bearing surface of the shell with a series of holes which perform the double function of reducing area of contact with the rollers and of acting as retardant pockets for the reception, detention and equitable distribution of the lubricant.

What I claim as my invention and desire to secure by Letters Patent is,

1. In a bearing of the character designated, the combination with rollers, of a containing shell formed with a lining constructed of a flat metallic strip having perforations throughout its length, the ends of the strip being overlapped within each other and said perforations being staggered relatively to each other transversely of the surface of said strip.

2. As an improved article of manufacture, a lining for roller bearings, the same composed of a strip of flat perforated metal having at one end a V-shaped projection and at the other end a correspondingly-shaped recess, said perforations being of elongated form and staggered with relation to each other transversely of said strip, said strip being bent into cylindrical form with the ends thereof interlocking.

BENJAMIN FRANKLYN SPARR.

Witnesses:
GEO. WM. MIATT,
DOROTHY MIATT.

Copies of this patent may be obtained for five cents each, by addressing the "Commissioner of Patents, Washington, D. C."